(12) United States Patent
Durocher

(10) Patent No.: US 12,709,403 B1
(45) Date of Patent: Aug. 18, 2026

(54) CLUTCH ASSEMBLY FOR A HYBRID-ELECTRIC AIRCRAFT PROPULSION SYSTEM

(71) Applicant: Pratt & Whitney Canada Corp., Longueuil (CA)

(72) Inventor: Eric S. Durocher, Boucherville (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 19/236,622

(22) Filed: Jun. 12, 2025

(51) Int. Cl.

| | |
|---|---|
| ***B64D 35/022*** | (2025.01) |
| ***B64D 27/33*** | (2024.01) |
| ***F02C 7/36*** | (2006.01) |
| ***F16D 11/14*** | (2006.01) |
| ***F16H 1/22*** | (2006.01) |
| ***F16H 57/021*** | (2012.01) |
| *F16D 11/00* | (2006.01) |
| *F16H 57/02* | (2012.01) |

(52) U.S. Cl.

CPC ........... *B64D 35/022* (2024.01); *B64D 27/33* (2024.01); *F02C 7/36* (2013.01); *F16D 11/14* (2013.01); *F16H 1/22* (2013.01); *F16H 57/021* (2013.01); *F05D 2260/4023* (2013.01); *F05D 2260/4031* (2013.01); *F16D 2011/008* (2013.01); *F16H 2057/02034* (2013.01); *F16H 2057/02043* (2013.01)

(58) Field of Classification Search

CPC .................................................... B64D 35/022

See application file for complete search history.

(56) References Cited

U.S. PATENT DOCUMENTS

| | | | | |
|---|---|---|---|---|
| 2,860,713 | A | 11/1958 | Peterson | |
| 10,247,252 | B2 * | 4/2019 | Littlefield | F16D 11/16 |
| 10,968,825 | B2 * | 4/2021 | Mackin | F02C 3/305 |
| 12,435,645 | B2 * | 10/2025 | Piazza | F01D 25/20 |
| 2021/0388733 | A1 | 12/2021 | Valois | |

FOREIGN PATENT DOCUMENTS

| | | | |
|---|---|---|---|
| EP | 2962885 | B1 | 7/2019 |
| WO | 2024090524 | A1 | 5/2024 |

* cited by examiner

*Primary Examiner* — Courtney D Heinle
*Assistant Examiner* — Danielle M. Christensen
(74) *Attorney, Agent, or Firm* — Getz Balich LLC

(57) ABSTRACT

An aircraft propulsion system includes an engine, an electric machine, a gearbox, and a propulsor. The gearbox includes an output shaft with a rotational axis, an electric machine drive gear mounted on the output shaft and driven by the electric machine, and an engine drive gear selectively couplable with the output shaft by a clutch assembly. The clutch assembly includes a coupling drive shaft mounted to the output shaft, a clutch housing mounted to the engine drive gear, and sliding clutch members moveably mounted to the clutch housing. The sliding clutch members are radially movable between inner and outer positions. In the outer position, the sliding clutch members engage the coupling drive shaft to couple the engine and output shaft. In the inner position, the sliding clutch members disengage from the coupling drive shaft to decouple the engine from the output shaft. The propulsor is driven by the output shaft.

20 Claims, 7 Drawing Sheets

26,56
166
168
62
92
60
74
78

26
62
eMachine
90
Accessory
166
168
Engine
22
74
72
58
84
4
78
76
88
86
92
56
64
68
80
82
70
60

CLUTCH ASSEMBLY FOR A HYBRID-ELECTRIC AIRCRAFT PROPULSION SYSTEM

TECHNICAL FIELD

This disclosure relates generally to hybrid-electric propulsion systems for aircraft and, more particularly, to a gearbox clutch assembly for hybrid-electric propulsion systems.

BACKGROUND OF THE ART

Hybrid-electric propulsion systems for aircraft may typically include an electric machine configured to supplement or replace a propulsion system engine (e.g., a gas turbine engine, an intermittent combustion engine, etc.) output to one or more propulsors. Various hybrid-electric propulsion system configurations are known. While these known propulsion system configurations may be suitable for their intended purposes, there is always room in the art for improvement.

SUMMARY

According to an aspect of the present disclosure, an aircraft propulsion system includes an engine, an electric machine, a gearbox, and a propulsor. The gearbox includes an output shaft, an electric machine drive gear, an engine drive gear, and a clutch assembly. The output shaft has a rotational axis. The electric machine drive gear is mounted on the output shaft. The electric machine drive gear is driven by the electric machine. The engine drive gear is selectively couplable with the output shaft by the clutch assembly. The clutch assembly includes a coupling drive shaft, a clutch housing, and a plurality of sliding clutch members. The coupling drive shaft is mounted to the output shaft. The clutch housing is mounted to the engine drive gear. The plurality of sliding clutch members are moveably mounted to the clutch housing. The plurality of sliding clutch members radially moveable between an outer radial position and an inner radial position. The plurality of sliding clutch members in the outer radial position are engaged with the coupling drive shaft. The clutch assembly couples the engine and the output shaft with the plurality of sliding clutch members in the outer radial position. The plurality of sliding clutch members in the inner radial position are disengaged from the coupling drive shaft. The engine is decoupled from the output shaft with the plurality of sliding clutch members in the inner radial position. The propulsor is driven by the output shaft.

In any of the aspects or embodiments described above and herein, the coupling drive shaft may include a first plurality of teeth, each of the plurality of sliding clutch members may include a second plurality of teeth, the first plurality of teeth may be radially outward of the second plurality of teeth, and the second plurality of teeth may be engaged with the first plurality of teeth with the plurality of sliding clutch members in the outer radial position.

In any of the aspects or embodiments described above and herein, the first plurality of teeth and the second plurality of teeth may include asymmetrical teeth.

In any of the aspects or embodiments described above and herein, the clutch housing may form a plurality of apertures, each of the plurality of sliding clutch members may include a post disposed within a respective one of the plurality of apertures, and the post may be radially moveable within the respective one of the apertures.

In any of the aspects or embodiments described above and herein, each of the plurality of sliding clutch members may include a spring compressed between the clutch housing and the post, and the spring may bias a respective one of the plurality of sliding clutch members in the inner radial position.

In any of the aspects or embodiments described above and herein, each of the plurality of sliding clutch members may include a clutch body and a weight, the clutch body may be configured to engage the coupling drive shaft with a respective one of the plurality of sliding clutch members in the outer radial position, and the weight may be selectively attachable on the clutch body.

In any of the aspects or embodiments described above and herein, the coupling drive shaft may include a first plurality of teeth, the clutch body may include a second plurality of teeth, the second plurality of teeth may be engaged with the first plurality of teeth with the plurality of sliding clutch members in the outer radial position, and the weight may be axially coincident with the second plurality of teeth.

In any of the aspects or embodiments described above and herein, the gearbox may further include a bearing disposed between the output shaft and the engine drive gear, and the engine drive gear may be rotatable relative to the output shaft on the bearing.

In any of the aspects or embodiments described above and herein, the engine may include an engine output shaft, the gearbox may include an input shaft and a layshaft assembly, the engine output shaft may be coupled with the input shaft, and the layshaft assembly may couple the input shaft with the engine drive gear.

In any of the aspects or embodiments described above and herein, the plurality of sliding clutch members may be arranged circumferentially about the rotational axis.

According to another aspect of the present disclosure, a method for coupling an engine of an aircraft propulsion system with a propulsor, the propulsor driven by an output shaft, an engine drive gear driven by the engine decoupled from the output shaft by a clutch assembly in a disengaged state, includes driving rotation of the propulsor about a rotational axis with an electric machine coupled with the propulsor by the output shaft and coupling the engine with the propulsor by controlling the engine to drive rotation of the engine drive gear about the rotational axis to configure the clutch assembly in an engaged state. The clutch assembly in the engaged state has a plurality of sliding clutch members engaged with a coupling drive shaft mounted to the output shaft. The plurality of sliding clutch members are radially moveable relative to the coupling drive shaft between an outer radial position and an inner radial position. The sliding clutch members in the outer radial position are engaged with the coupling drive shaft in the engaged state. The sliding clutch members in the inner radial position are disengaged from the coupling drive shaft in the disengaged state. Coupling the engine with the propulsor includes controlling the engine to increase a rotation speed of the engine drive gear until the sliding clutch members move from the inner radial position to the outer radial position.

In any of the aspects or embodiments described above and herein, the engine may include an engine output shaft, and the coupling the engine with the propulsor may further include controlling the engine to increase a rotation speed of the engine output shaft greater than or equal to a predetermined rotation speed corresponding to the engaged state.

In any of the aspects or embodiments described above and herein, coupling the engine with the propulsor may include relighting the engine.

In any of the aspects or embodiments described above and herein, the method may further include deenergizing the electric machine subsequent to coupling the engine with the propulsor.

According to another aspect of the present disclosure, an aircraft propulsion system includes an engine, an electric machine, a gearbox, and a propulsor. The gearbox includes an output shaft, an engine drive gear, and a clutch assembly. The output shaft has a rotational axis. The electric machine is coupled with the output shaft. The engine drive gear extends circumferentially about the output shaft. The engine drive gear is rotatable relative to the output shaft. The engine drive gear is selectively couplable with the output shaft by the clutch assembly. The clutch assembly includes a coupling drive shaft, a clutch housing, and a plurality of sliding clutch members. The coupling drive shaft is mounted to the output shaft. The clutch housing is mounted to the engine drive gear. The plurality of sliding clutch members are moveably mounted to the clutch housing. The plurality of sliding clutch members are radially moveable between an outer radial position and an inner radial position. The plurality of sliding clutch members are biased in the inner radial position. The plurality of sliding clutch members in the outer radial position are engaged with the coupling drive shaft. The clutch assembly couples the engine and the output shaft with the plurality of sliding clutch members in the outer radial position. The plurality of sliding clutch members in the inner radial position are disengaged from the coupling drive shaft. The engine is decoupled from the output shaft with the plurality of sliding clutch members in the inner radial position. The propulsor is driven by the output shaft.

In any of the aspects or embodiments described above and herein, the coupling drive shaft may include a first plurality of teeth, each of the plurality of sliding clutch members may include a second plurality of teeth, the first plurality of teeth may be radially outward of the second plurality of teeth, and the second plurality of teeth may be engaged with the first plurality of teeth with the plurality of sliding clutch members in the outer radial position.

In any of the aspects or embodiments described above and herein, the clutch housing may form a plurality of apertures, each of the plurality of sliding clutch members may include a post disposed within a respective one of the plurality of apertures, and the post may be radially moveable within the respective one of the apertures.

In any of the aspects or embodiments described above and herein, each of the plurality of sliding clutch members may include a clutch body and a weight, the clutch body may be configured to engage the coupling drive shaft with a respective one of the plurality of sliding clutch members in the outer radial position, and the weight may be selectively attachable on the clutch body.

In any of the aspects or embodiments described above and herein, the gearbox may further include a bearing disposed between the output shaft and the engine drive gear, and the engine drive gear may be rotatable relative to the output shaft on the bearing.

In any of the aspects or embodiments described above and herein, the engine may include an engine output shaft, the gearbox may include an input shaft and a layshaft assembly, the engine output shaft may be coupled with the input shaft, and the layshaft assembly may couple the input shaft with the engine drive gear.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
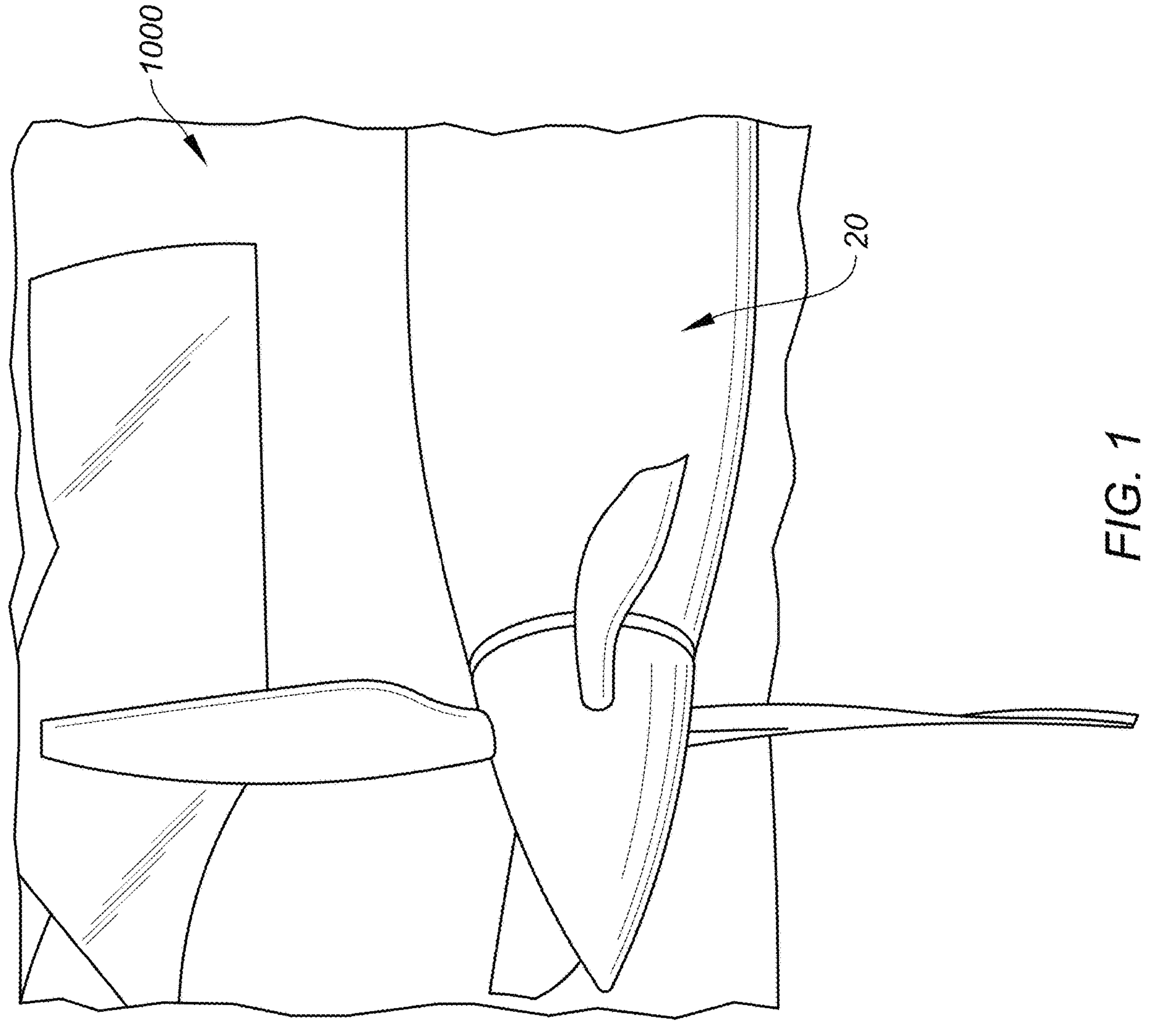
FIG. 1 illustrates an aircraft including a propulsion system, in accordance with one or more embodiments of the present disclosure.

FIG. 1 illustrates an aircraft 1000 including at least one propulsion system 20.

Briefly, the aircraft may be a fixed-wing aircraft (e.g., an airplane), a rotary-wing aircraft (e.g., a helicopter), a tilt-rotor aircraft, a tilt-wing aircraft, or another aerial vehicle. Moreover, the aircraft may be a manned aerial vehicle or an unmanned aerial vehicle (UAV, e.g., a drone).

Figure 2:
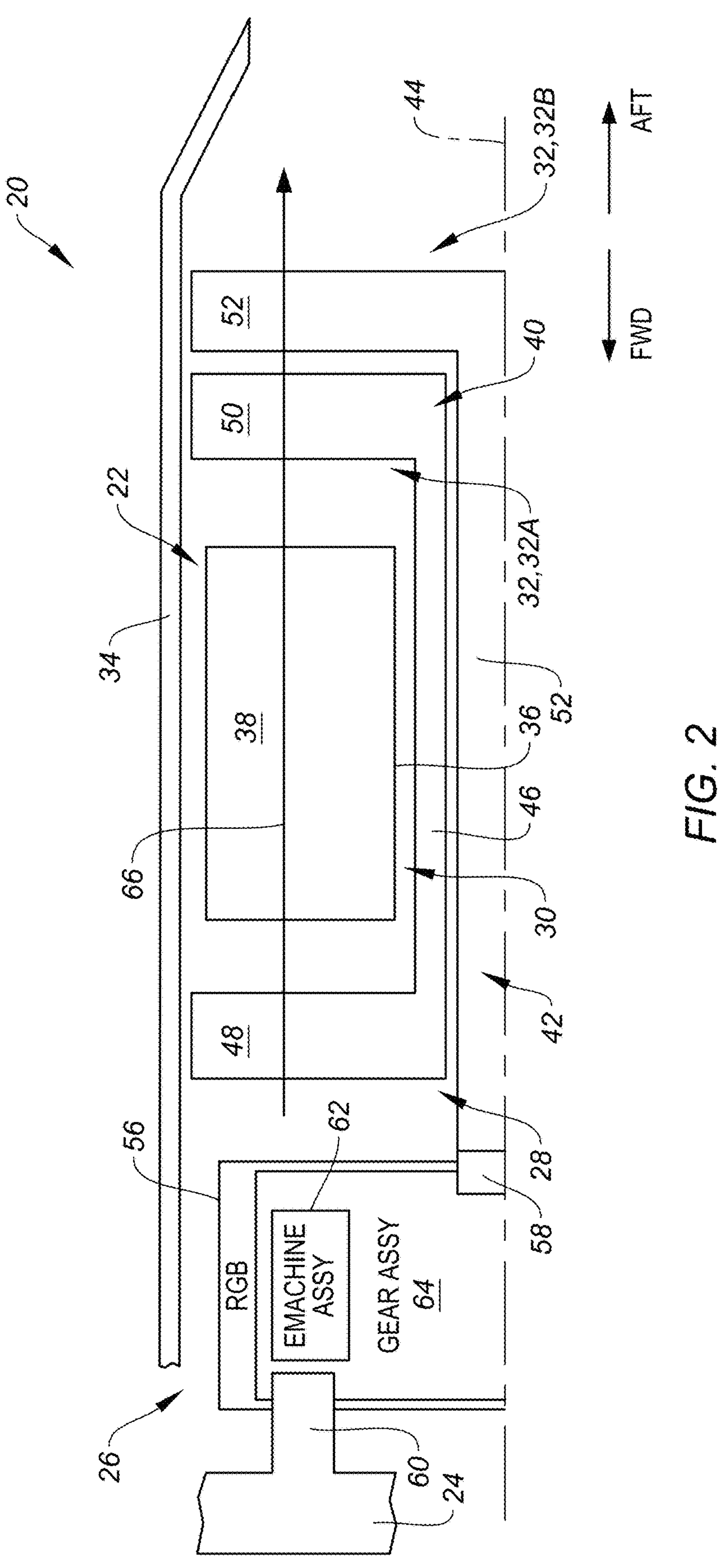
FIG. 2 schematically illustrates a cutaway, side view of an aircraft propulsion system, in accordance with one or more embodiments of the present disclosure.

FIG. 2 schematically illustrates a cutaway, side view of the propulsion system 20. The propulsion system 20 of FIG. 2 includes an engine 22, a propulsor 24, and a drivetrain 26. The engine 22 of FIG. 2 is configured as a turboprop gas turbine engine. However, the present disclosure is not limited to any particular configuration of gas turbine engine for the propulsion system 20, and examples of gas turbine engine configurations for the propulsion system 20 may include, but are not limited to, a turbofan engine, a turbojet engine, a propfan engine, or the like. Aspects of the present disclosure may be equally applicable to aircraft propulsion systems including other engine configurations such as, but not limited to, rotary engines, piston engines, or other intermittent combustion engines.

The engine 22 of FIG. 2 includes a compressor section 28, a combustor section 30, a turbine section 32, and an engine static structure 34. The combustor section 30 includes a combustor 36 (e.g., an annular combustor) forming a combustion chamber 38. The turbine section 32 includes a high-pressure turbine 32A and a power turbine 32B.

Components of the compressor section 28 and/or the turbine section 32 of FIG. 2 form a first rotational assembly 40 (e.g., a high-pressure spool) and a second rotational assembly 42 of the engine 22. The first rotational assembly 40 and the second rotational assembly 42 are mounted for rotation about a rotational axis 44 (e.g., an axial centerline) of the engine 22 relative to the engine static structure 34.

The first rotational assembly 40 includes a first shaft 46, a bladed compressor rotor 48 for the compressor section 28, and a bladed first turbine rotor 50 for the high-pressure turbine 32A. The first shaft 46 interconnects the bladed compressor rotor 48 and the first turbine rotor 50.

The second rotational assembly 42 of FIG. 2 includes a second shaft 52 (e.g., an engine output shaft) and a bladed power turbine rotor 54 for the power turbine 32B. The second shaft 52 is connected to the power turbine rotor 54. The second shaft 52 is coupled with the propulsor 24 by the drivetrain 26.

The drivetrain 26 includes a gearbox 56 (e.g., a reduction gearbox (RGB)). The gearbox 56 may assume different configurations. The term "gearbox" as used herein may refer to a reduction gearbox that is configured to accept an input rotational drive at a first rotational speed (S1) and at a first torque (T1) and produce an output rotational drive at a second rotational speed (S2) and at a second torque (T2), wherein the first rotational speed is greater than the second rotational speed (S1>S2) and the second torque is greater than the first torque (T2>T1). The drivetrain 26 further includes a gearbox input shaft 58, a gearbox output shaft 60 (e.g., a propulsor output shaft or a propeller shaft), and an electric machine assembly 62.

The gearbox 56 includes and houses a gear assembly 64. The gear assembly 64 couples the gearbox input shaft 58 with the gearbox output shaft 60. For example, the gear assembly 64 may be a reduction gear assembly configured to drive rotation of the gearbox output shaft 60 at a reduced rotational speed relative to the gearbox input shaft 58. The gearbox input shaft 58 is coupled with (e.g., mounted on) the second shaft 52, and interconnects the second shaft 52 with the gear assembly 64. The gearbox output shaft 60 is coupled with (e.g., mounted on) the propulsor 24, and interconnects the propulsor 24 with the gear assembly 64. As will be described in further detail, the electric machine assembly 62 includes one or more electric machines coupled with the gearbox output shaft 60.

The engine static structure 34 includes engine casings, cowlings, and other fixed (e.g., non-rotating) structures of the engine 22 which form, house, and/or support components of the engine 22 such as, but not limited to, those of the compressor section 28, the combustor section 30, and the turbine section 32. The engine static structure 34 may include one or more bearing assemblies configured to rotationally support components of the first rotational assembly 40 and the second rotational assembly 42.

During operation of the propulsion system 20 of FIG. 2, ambient air enters the propulsion system 20 (e.g., through an air intake) and is directed through the engine 22 along a core gas flow path 66. The ambient air flow along the core gas flow path 66 is compressed in the compressor section 28 by rotation of the bladed compressor rotor 48, and directed into the combustor 36 (e.g., the combustion chamber 38). Fuel is injected into the combustion chamber 38 and mixed with the compressed air to provide a fuel-air mixture. This fuel-air mixture is ignited, and combustion products thereof flow through the high-pressure turbine 32A and the power turbine 32B and are exhausted from the propulsion system 20. The first turbine rotor 50 and the power turbine rotor 54 rotationally drive the first rotational assembly 40 and the second rotational assembly 42, respectively, in response to the combustion gas flow through the high-pressure turbine 32A and the power turbine 32B along the core gas flow path 66. The second rotational assembly 42 (e.g., the second shaft 52) drives rotation of the propulsor 24 through the drivetrain 26. The engine 22 and the electric machine(s) of the electric machine assembly 62 may be selectively operated to drive rotation of the propulsor 24 through the gearbox output shaft 60 through the gear assembly 64.

Figures 3, 4:
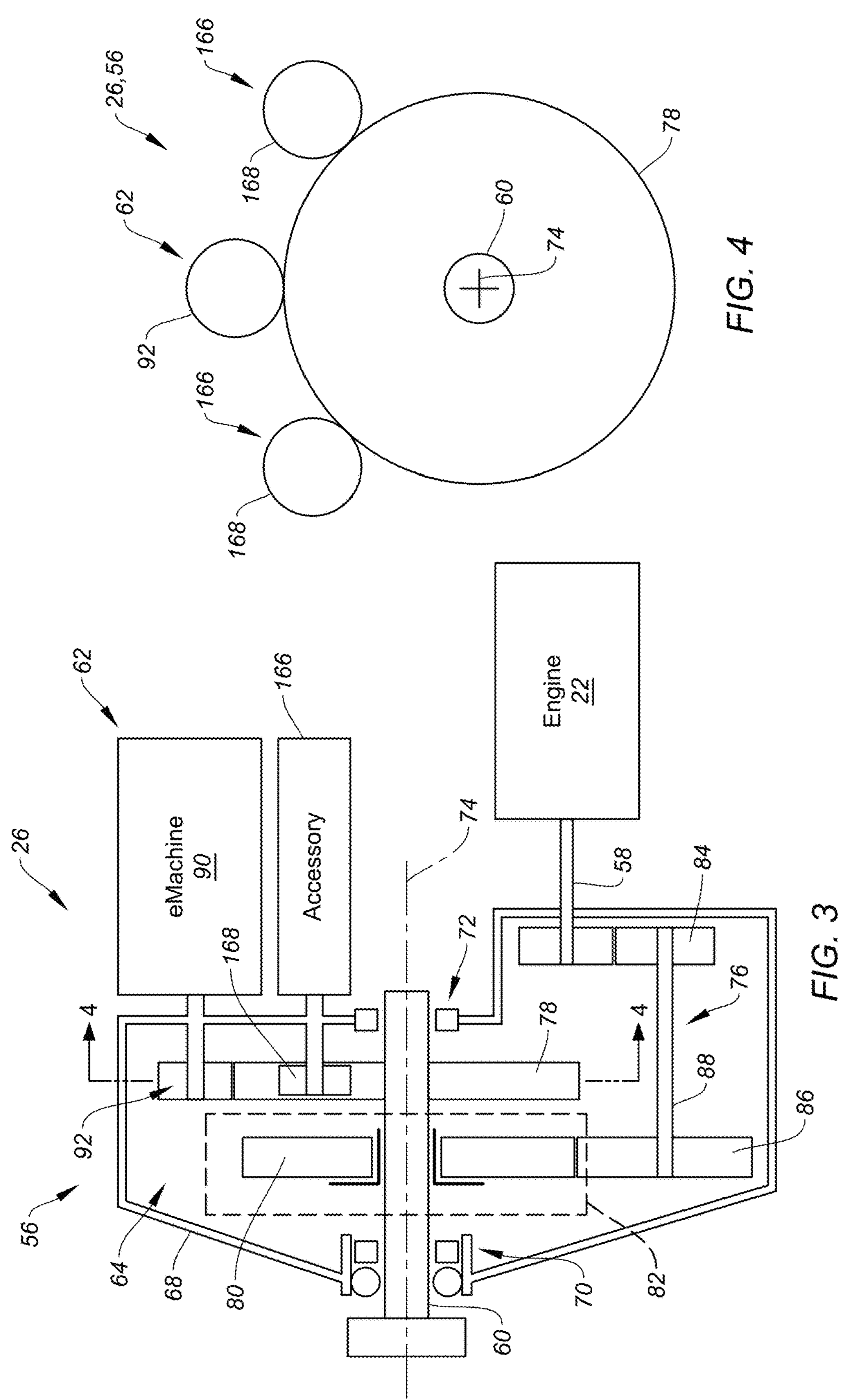
FIG. 3 schematically illustrates a cutaway, side view of a portion of a gearbox, electric machine assembly, and engine of the aircraft propulsion system, in accordance with one or more embodiments of the present disclosure.
FIG. 4 schematically illustrates a cross-sectional view of the gearbox taken along Line 4-4 of FIG. 3, in accordance with one or more embodiments of the present disclosure.

FIG. 3 schematically illustrates a cutaway, side view of the gearbox 56 coupled with the engine 22 and the electric machine assembly 62. The gearbox 56 includes a gearbox housing 68, a forward bearing assembly 70, and an aft bearing assembly 72. The gearbox housing 68 houses the gear assembly 64. The gearbox housing 68 structurally supports the forward bearing assembly 70 and the aft bearing assembly 72. The gearbox output shaft 60 is mounted on the forward bearing assembly 70 and the aft bearing assembly 72 for rotation about an output shaft rotational axis 74. The gear assembly 64 of FIG. 3 includes a layshaft assembly 76, an electric machine drive gear 78, an engine drive gear 80, and a clutch assembly 82.

The layshaft assembly 76 includes a layshaft input gear 84, a layshaft output gear 86, and a layshaft 88. The layshaft input gear 84 is engaged (e.g., meshed) with the gearbox input shaft 58. The layshaft output gear 86 is engaged (e.g., meshed) with the engine drive gear 80. The layshaft 88 interconnects the layshaft input gear 84 and the layshaft output gear 86. FIG. 3 illustrates a single layshaft assembly 76 coupling the gearbox input shaft 58 with the engine drive gear 80; however, in some embodiments, the gear assembly 64 may include more than one layshaft assembly 76 (e.g., two layshaft assemblies) coupling the gearbox input shaft 58 with the engine drive gear 80.

The electric machine drive gear 78 is mounted (e.g., fixedly mounted) on the gearbox output shaft 60. The electric machine drive gear 78 extends circumferentially about (e.g., completely around) the gearbox output shaft 60 and the output shaft rotational axis 74. The electric machine drive gear 78 may be disposed axially between the engine drive gear 80 and the aft bearing assembly 72. The electric machine drive gear 78 is coupled with an electric machine 90 (e.g., an electric motor) of the electric machine assembly 62. In particular, the electric machine drive gear 78 is engaged (e.g., meshed) with an electric machine output shaft 92 of the electric machine 90. FIG. 3 illustrates a single electric machine 90 coupled with the electric machine drive gear 78; however, in some embodiments, the electric machine assembly 62 may include more than one electric machine 90 coupled with the electric machine drive gear 78.

The engine drive gear 80 extends circumferentially about (e.g., completely around) the gearbox output shaft 60 and the output shaft rotational axis 74. The engine drive gear 80 may be disposed axially between the electric machine drive gear 78 and the forward bearing assembly 70. The engine drive gear 80 is selectively couplable with the gearbox output shaft 60 by the clutch assembly 82.

FIG. 4 schematically illustrates a cross-sectional view of the gear assembly 64 taken along Line 4-4 of FIG. 3. Referring to FIGS. 3 and 4, the gearbox 56 may be coupled to one or more accessory load assemblies 166 of the propulsion system 20 and its engine 22. The gearbox housing 68 may provide support for the accessory load assemblies 166.

Each of the accessory load assemblies 166 may be driven by a respective offset gear 168 engaged (e.g., meshed) with the electric machine drive gear 78. Each of the offset gears 168 may be sized (e.g., relative to the electric machine drive gear 78) to facilitate a suitable rotational speed (e.g., speed ratio) for the respective the accessory load assemblies 166. The present disclosure is not limited to any particular number, arrangement, size, or other configuration of the offset gears 168. Examples of the accessory load assemblies 166 may include oil pumps, propeller control units (PCUs), air compressors, electrical generators (e.g., a low-voltage generator), a hydraulic pump, and the like. The configuration of the accessory load assemblies 166 and respective offset gears 168 of FIGS. 3 and 4 facilitate driving the accessory load assemblies 166 with the electric machine(s) 90 during propulsion system 20 operating conditions where the engine 22 may be shutdown. This configuration further facilitates driving the accessory load assemblies 166 with the engine 22 alone or with both the engine 22 and the electric motor(s) 90 during other operating conditions of the propulsion system 20.

Figure 5:
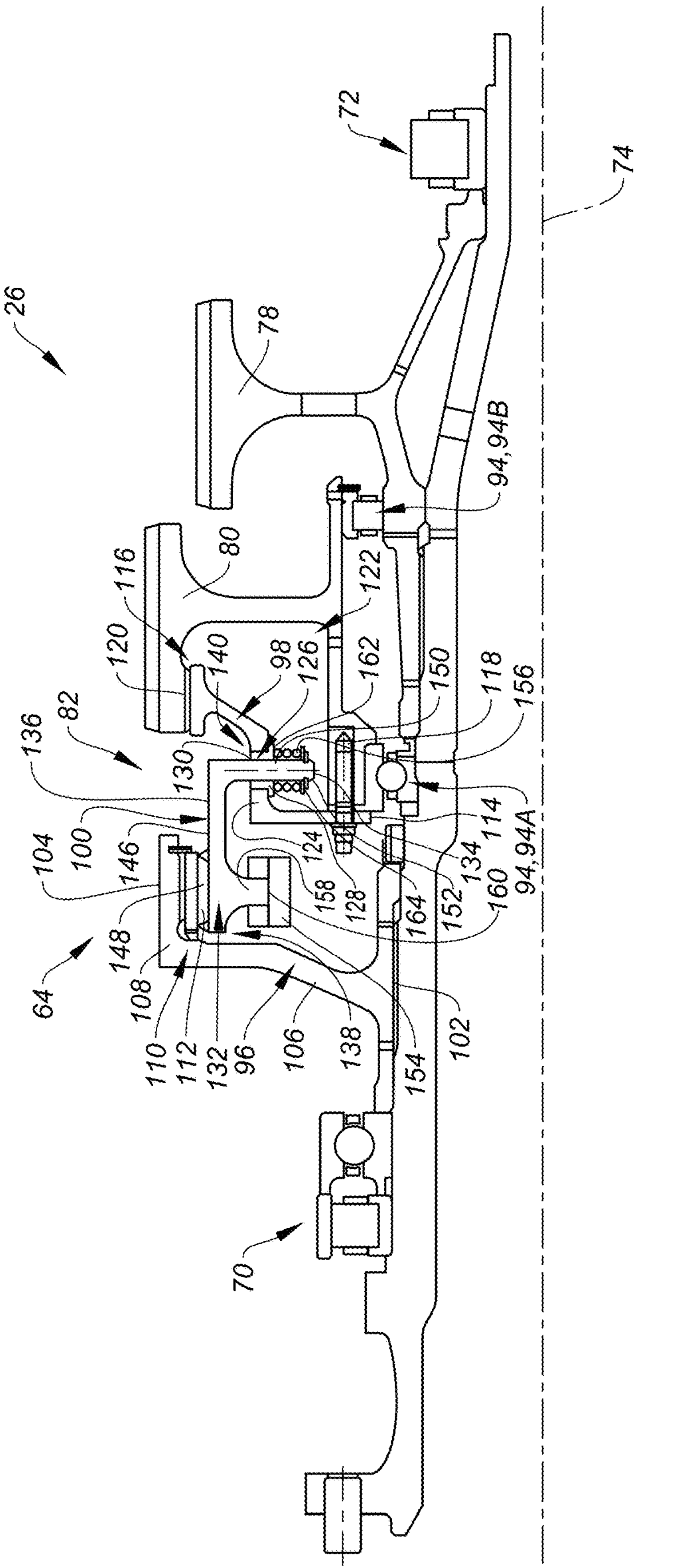
FIG. 5 illustrates a cutaway, side view of a clutch assembly of the gearbox, in accordance with one or more embodiments of the present disclosure.
Figure 6:
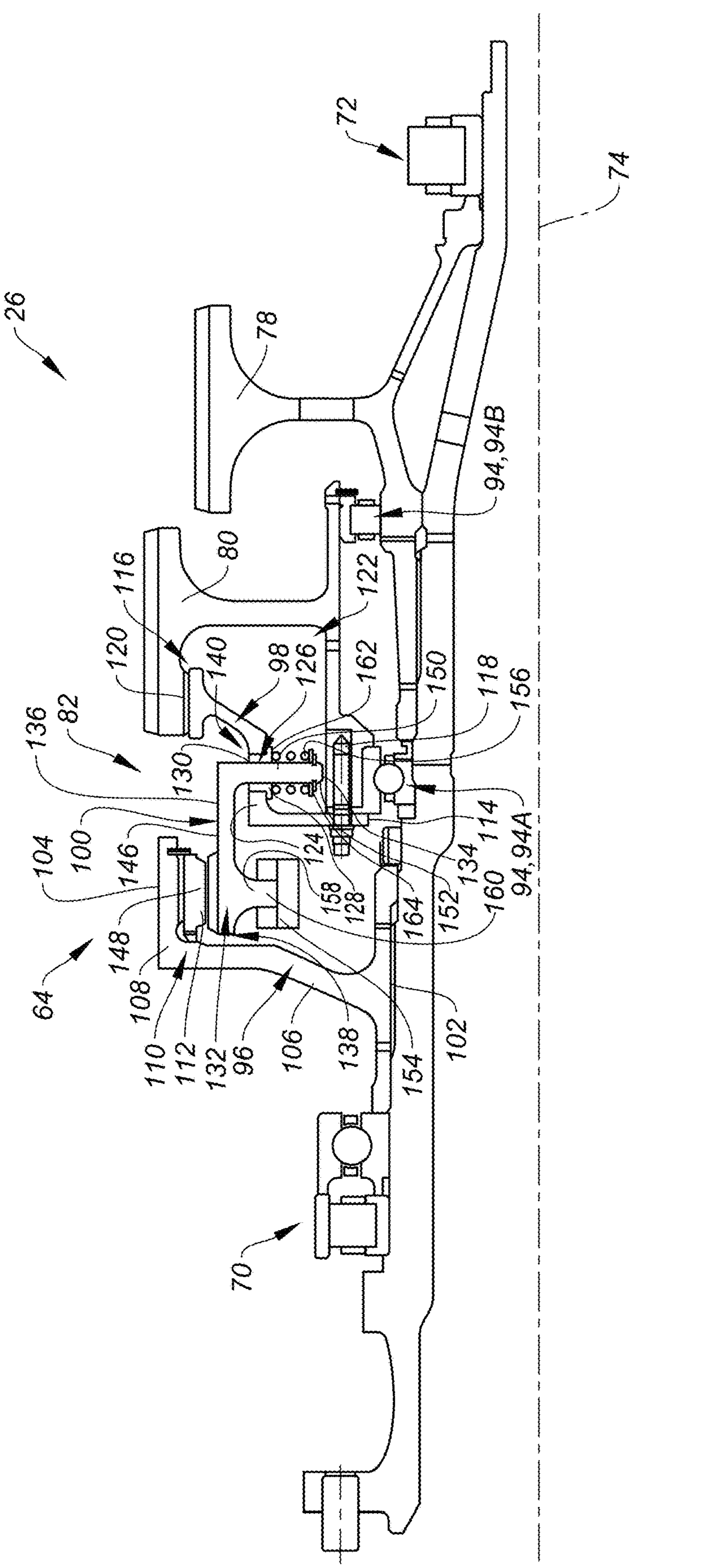
FIG. 6 illustrates another cutaway, side view of the clutch assembly, in accordance with one or more embodiments of the present disclosure.
Figure 7:
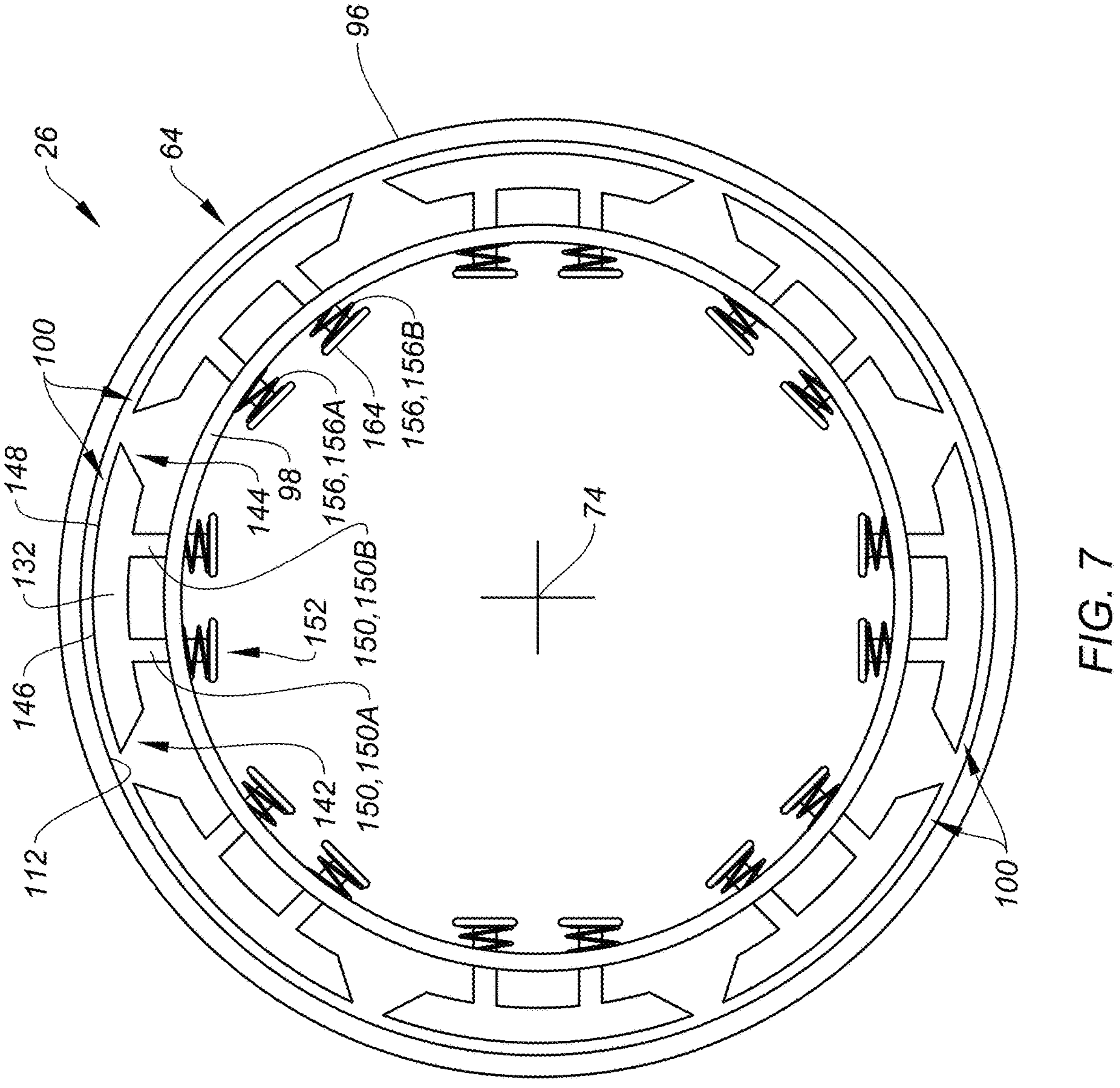
FIG. 7 schematically illustrates a partial-cutaway, front view of the clutch assembly, in accordance with one or more embodiments of the present disclosure.

FIGS. 5-7 illustrate cutaway, side views of the gear assembly 64 showing the clutch assembly 82 in greater detail. FIG. 5 shows the clutch assembly 82 in an engaged state in which the clutch assembly 82 couples the engine drive gear 80 with the gearbox output shaft 60. FIG. 6 shows the clutch assembly 82 in a disengaged state in which the engine drive gear 80 is rotationally decoupled from the gearbox output shaft 60 by the clutch assembly 82. FIG. 7 schematically illustrates a partial-cutaway, front view of the clutch assembly 82. The clutch assembly 82 includes one or more engine drive gear bearings 94, a coupling drive shaft 96, a clutch housing 98, and a plurality of sliding clutch members 100.

The engine drive gear bearings 94 are mounted on the gearbox output shaft 60 and/or the electric machine drive gear 78. For example, the engine drive gear bearings 94 of FIGS. 5 and 6 include a first bearing 94A mounted on the gearbox output shaft 60 and a second bearing 94B mounted on the electric machine drive gear 78. The engine drive gear bearings 94 extend circumferentially about the gearbox output shaft 60 and its output shaft rotational axis 74. The engine drive gear 80 is rotationally mounted on the engine drive gear bearings 94 with the engine drive gear bearings 94 disposed radially between the engine drive gear 80 and the gearbox output shaft 60 and/or the electric machine drive gear 78. The engine drive gear 80 is rotatable on the engine drive gear bearings 94 about the output shaft rotational axis 74 relative to the gearbox output shaft 60 and the electric machine drive gear 78.

The coupling drive shaft 96 is an annular body extending circumferentially about (e.g., completely around) the gearbox output shaft 60 and its output shaft rotational axis 74. The coupling drive shaft 96 extends between and to an inner radial end 102 of the coupling drive shaft 96 and an outer radial end 104 of the coupling drive shaft 96. The coupling drive shaft 96 is mounted (e.g., fixedly mounted) on the gearbox output shaft 60 at its inner radial end 102. The coupling drive shaft 96 includes a radially-extending segment 106 and an axially-extending segment 108. The radially-extending segment 106 extends radially between the inner radial end 102 and the axially-extending segment 108. The axially-extending segment 108 extends axially (e.g., aftward) from the radially-extending segment 106 along the outer radial end 104. The axially-extending segment 108 is disposed radially outward of the sliding clutch members 100. The axially-extending segment 108 forms an inner radial surface 110 facing radially inward toward the gearbox output shaft 60. The coupling drive shaft 96 includes a plurality of teeth 112 on the inner radial surface 110. The teeth 112 are arranged as a circumferential array along the inner radial surface 110.

The clutch housing 98 is an annular body extending circumferentially about (e.g., completely around) the gearbox output shaft 60 and its output shaft rotational axis 74. The clutch housing 98 extends between and to an inner radial end 114 of the clutch housing 98 and an outer radial end 116 of the clutch housing 98. The clutch housing 98 is mounted (e.g., fixedly mounted) to the engine drive gear 80. For example, the clutch housing 98 of FIGS. 5 and 6 is fixedly mounted to the engine drive gear 80 by mechanical fasteners 118 (e.g., bolts) at the inner radial end 114 and by a splined interface 120 with the engine drive gear 80 at the outer radial end 116. The present disclosure, however, is not limited to the foregoing exemplary mounting configuration of the clutch housing 98 to the engine drive gear 80. The clutch housing 98 of FIGS. 5 and 6 forms an annular cavity 122 between and bounded by the clutch housing 98 and the engine drive gear 80. The clutch housing 98 includes an axially-extending segment 124. The axially-extending segment 124 is disposed at a radially-intermediate position of the clutch housing 98 between the inner radial end 114 and the outer radial end 116. The axially-extending segment 124 forms a plurality of apertures 126 extending radially through the axially-extending segment 124 between and to an inner radial end 128 of each of the apertures 126 and an outer radial end 130 of each of the apertures 126. The inner radial end 128 is disposed at the cavity 122. The apertures 126 are arranged on the axially-extending segment 124 as a circumferential array. The clutch housing 98 may include a sleeve bearing, a bushing, or the like forming each of the apertures 126.

The sliding clutch members 100 are arranged as a circumferential array about the gearbox output shaft 60 and its output shaft rotational axis 74. For example, the sliding clutch members 100 may be circumferentially equispaced about the gearbox output shaft 60 and its output shaft rotational axis 74. As will be discussed in further detail, each of the sliding clutch members 100 is moveably mounted to the clutch housing 98. Each of the sliding clutch members 100 includes a clutch body 132, a weight 154, and one or more springs 156. The clutch body 132 extends radially between and to an inner radial end 134 of the clutch body 132 and an outer radial end 136 of the clutch body 132. The clutch body 132 extends axially between and to a first axial end 138 (e.g., a forward axial end) of the clutch body 132 and a second axial end 140 (e.g., an aft axial end) of the clutch body 132. The clutch body 132 extends circumferentially between and to a first circumferential end 142 of the clutch body 132 and a second circumferential end 144 of the clutch body 132.

Figure 8:
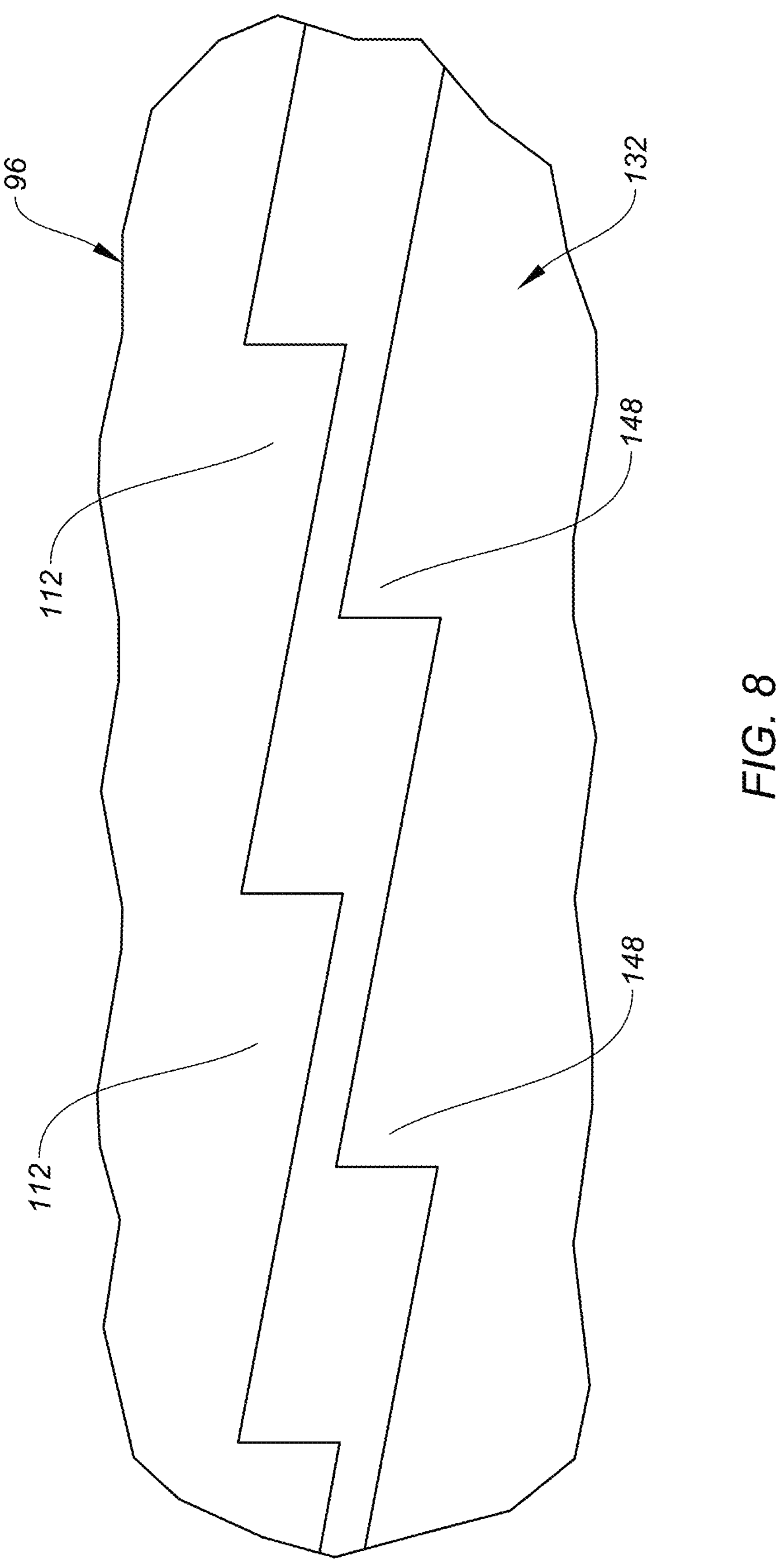
FIG. 8 schematically illustrates a portion of the clutch assembly including an asymmetric teeth arrangement, in accordance with one or more embodiments of the present disclosure.

The clutch body 132 forms an outer radial surface 146 at the outer radial end 136. The outer radial surface 146 may extend from the first axial end 138 to the second axial end 140 along the outer radial end 136. The outer radial surface 146 is an arcuate surface extending between and to the first circumferential end 142 and the second circumferential end 144. The clutch body 132 includes a plurality of teeth 148 on the outer radial surface 146. The teeth 148 are arranged as a circumferential array along the circumferential span of the outer radial surface 146. The outer radial end 136 and the teeth 148 are disposed radially between the teeth 112 and the axially-extending segment 124. The teeth 148 are disposed axially coincident with the teeth 112. The teeth 148 are configured for engagement (e.g., meshing) with the teeth 112. As shown in FIG. 8, the teeth 112 and the teeth 148 may be asymmetric teeth (e.g., ratchet teeth, sawtooth teeth, etc.) configured for torque transfer in only one rotational direction while allowing slippage between the teeth 112, 148 in the opposite rotational direction. Alternatively, the teeth 112 and the teeth 148 may be symmetric teeth configured for torque transfer in both rotational directions.

The clutch body 132 includes one or more radially-extending posts 150. For example, as shown in FIG. 7, the clutch body 132 may include a first post 150A and a second post 150B. The first post 150A is circumferentially spaced from the second post 150B. The present disclosure, however, is not limited to any particular quantity or relative orientations of the posts 150. The posts 150 may be disposed at the second axial end 140. Each of the posts 150 of FIGS. 5-7 extends radially along the second axial end 140 between the inner radial end 134 and the outer radial end 136. Each of the posts 150 includes a distal end 152 at the inner radial end 134. Each of the posts 150 is disposed within a respective one of the apertures 126. Each of the posts 150 is configured to slide (e.g., translate) radially within the respective one of the apertures 126. The distal end 152 is disposed radially inward of the axially-extending segment 124 and within the cavity 122.

The clutch body 132 may further include an attachment body portion 158 for the weight 154. The attachment body portion 158 may be disposed axially coincident with the teeth 148, for example, at the first axial end 138. The attachment body portion 158 may be disposed radially inward of the teeth 148. The attachment body portion 158 may include a post or other projecting body portion of the clutch body 132 extending radially inward to a distal radial end 160. The attachment body portion 158 is configured for selective attachment of the weight 154 onto the attachment body portion 158. For example, the attachment body portion 158 may include mechanical fastener apertures or other structural attachment features configured to facilitate selective attachment and detachment of the weight 154 relative to the attachment body portion 158. The weight 154 is fixed relative to the clutch body 132. For example, the weight 154 may be attached to the clutch body 132 at the attachment body portion 158. Alternatively, the weight and the clutch body 132 may form a unitary structure. The term "unitary structure," as used herein, means a single component, wherein elements of the clutch body 132 and the weight 154 are an inseparable body (e.g., formed of a single material, or a weldment of independent elements, etc.).

Each of the springs 156 is disposed on a respective one of the posts 150. For example, as shown in FIG. 7, each of the sliding clutch members 100 may include a first spring 156A disposed on the first post 150A and a second spring 156B disposed on the second post 150B. Each of the springs 156 circumscribes the respective one of the posts 150. The springs 156 are disposed within the cavity 122. The springs 156 are compressed between the axially-extending segment 124 and the respective one of the posts 150. For example, each of the springs 156 may contact and be compressed between an inner radial surface 162 of the axially-extending segment 124 and an enlarged portion 164 of the respective one of the posts 150 (e.g., at its distal end 152). The springs 156 bias each of the respective sliding clutch members 100 in a radially inward direction.

Each of the sliding clutch members 100 is radially slidable (e.g., translatable) relative to the coupling drive shaft 96 and the clutch housing 98. Each of the sliding clutch members 100 is radially slidable along a range of radial positions including an engaged position and a disengaged position. The engaged position is an outer radial position of the sliding clutch members 100 in which the teeth 148 engage the teeth 112 on the coupling drive shaft 96. In this engaged state of the clutch assembly 82, the engine 22 is coupled with the gearbox output shaft 60 sequentially through the gearbox input shaft 58, the layshaft assembly 76, the engine drive gear 80, the clutch housing 98, the sliding clutch members 100, and the coupling drive shaft 96. The disengaged position is an inner radial position (e.g., a range of inner radial positions) in which the teeth 148 are disengaged (e.g., radially separated) from the teeth 112 on the coupling drive shaft 96. In this disengaged state of the clutch assembly 82, the engine 22 is rotationally decoupled from the gearbox output shaft 60. The springs 156 of each of the sliding clutch members 100 bias the respective sliding clutch members 100 radially inward toward their disengaged position.

During some flight modes, it may be desirable to drive rotation of the propulsor 24 with only the electric machine assembly 62 (e.g., the electric machine(s) 90). The electric machine(s) 90 may drive rotation of the gearbox output shaft 60 through the electric machine drive gear 78 while the clutch assembly 82, in its disengaged state, rotationally decouples the engine 22 from the gearbox output shaft 60. In these electric-only flight modes, the engine 22 may be shut down, idled, or otherwise operated mechanically independent of the gearbox output shaft 60 with the engine output shaft 60 rotating (e.g., freely) relative to the engine drive gear 80 as facilitated by the engine drive gear bearings 94.

During some other flight modes, it may be desirable to drive rotation of the propulsor 24 with only the engine 22 or with a combination of the engine 22 and the electric machine assembly 62. The engine 22 may drive rotation of the gearbox output shaft 60 through the engine drive gear 80 and the clutch assembly 82 once the clutch assembly 82 is configured in its engaged state. The engine 22 may initially be in a shut down or idle operating condition. To configure the clutch assembly 82 in its engaged state, a pilot or other operator of the aircraft 1000 (see FIG. 1) may relight (e.g., initiate fuel flow and combustion in the engine 22) and/or control the engine 22 to increase a rotation speed of the gearbox input shaft 58 driven by the engine 22 (e.g., the second rotational assembly 42). As the rotation speed of the gearbox input shaft 58 increases, and in turn the layshaft assembly 76, the engine drive gear 80, the clutch housing 98, the sliding clutch members 100, the increased centrifugal force applied to the sliding clutch members 100 and facilitated by the weight 154 causes the sliding clutch members 100 to slide radially outward against the biasing force of the springs 156 until the teeth 148 engage the teeth 112, thereby transmitting torque from the engine 22 to the gearbox output shaft 60 through the coupling drive shaft 96. The biasing force of the springs 156 facilitates avoiding premature contact between the teeth 112 and the teeth 148 when a rotation speed differential between the sliding clutch members 100 and the coupling drive shaft 96 may be sufficient to premature wear and/or damage to the teeth 112, 148. A biasing force of the springs 156 and a mass of the weight 154 may be selected to facilitate engagement between the teeth 112, 148 at a predetermined engine 22 output, such as an engine output shaft (e.g., the second shaft 52) and/or power turbine speed, at or above a normal operating speed (e.g., efficient operating speed) of the engine output shaft. For example, the predetermined engine 22 output may correspond to 100 percent of the maximum rated power output of the power turbine 32B (see FIG. 2; e.g., 100% nominal power turbine "NPT"). The engine 22 may be controlled to increase a rotation speed of the engine output shaft greater than or equal to a predetermined rotation speed corresponding to the engaged state of the clutch assembly 82. Once the engine 22 is coupled with the gearbox output shaft 60, some or all of the electric machine(s) 90 may optionally be deenergized.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

The terms "substantially," "about," "approximately," and other similar terms of approximation used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims, and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. An aircraft propulsion system, comprising:

an engine;

an electric machine;

a gearbox including an output shaft, an electric machine drive gear, an engine drive gear, and a clutch assembly, the output shaft having a rotational axis, the electric machine drive gear mounted on the output shaft, the electric machine drive gear driven by the electric machine, the engine drive gear selectively couplable with the output shaft by the clutch assembly, the clutch assembly including a coupling drive shaft, a clutch housing, and a plurality of sliding clutch members, the coupling drive shaft mounted to the output shaft, the clutch housing mounted to the engine drive gear, the plurality of sliding clutch members moveably mounted to the clutch housing, the plurality of sliding clutch members radially moveable between an outer radial position and an inner radial position, the plurality of sliding clutch members in the outer radial position engaged with the coupling drive shaft, the clutch assembly coupling the engine and the output shaft with the plurality of sliding clutch members in the outer radial position, the plurality of sliding clutch members in the inner radial position disengaged from the coupling drive shaft, the engine decoupled from the output shaft with the plurality of sliding clutch members in the inner radial position; and a propulsor driven by the output shaft.

2. The aircraft propulsion system of claim 1, wherein the coupling drive shaft includes a first plurality of teeth, each of the plurality of sliding clutch members includes a second plurality of teeth, the first plurality of teeth are radially outward of the second plurality of teeth, and the second plurality of teeth are engaged with the first plurality of teeth with the plurality of sliding clutch members in the outer radial position.

3. The aircraft propulsion system of claim 2, wherein the first plurality of teeth and the second plurality of teeth including asymmetrical teeth.

4. The aircraft propulsion system of claim 1, wherein the clutch housing forms a plurality of apertures, each of the plurality of sliding clutch members includes a post disposed within a respective one of the plurality of apertures, and the post is radially moveable within the respective one of the apertures.

5. The aircraft propulsion system of claim 4, wherein each of the plurality of sliding clutch members includes a spring compressed between the clutch housing and the post, and the spring biases a respective one of the plurality of sliding clutch members in the inner radial position.

6. The aircraft propulsion system of claim 1, wherein each of the plurality of sliding clutch members includes a clutch body and a weight, the clutch body is configured to engage the coupling drive shaft with a respective one of the plurality of sliding clutch members in the outer radial position, and the weight is selectively attachable on the clutch body.

7. The aircraft propulsion system of claim 6, wherein the coupling drive shaft includes a first plurality of teeth, the clutch body includes a second plurality of teeth, the second plurality of teeth are engaged with the first plurality of teeth with the plurality of sliding clutch members in the outer radial position, and the weight is axially coincident with the second plurality of teeth.

8. The aircraft propulsion system of claim 1, wherein the gearbox further includes a bearing disposed between the output shaft and the engine drive gear, and the engine drive gear is rotatable relative to the output shaft on the bearing.

9. The aircraft propulsion system of claim 1, wherein the engine includes an engine output shaft, the gearbox includes an input shaft and a layshaft assembly, the engine output shaft is coupled with the input shaft, and the layshaft assembly couples the input shaft with the engine drive gear.

10. The aircraft propulsion system of claim 1, wherein the plurality of sliding clutch members are arranged circumferentially about the rotational axis.

11. A method for coupling an engine of an aircraft propulsion system with a propulsor, the propulsor driven by an output shaft, an engine drive gear driven by the engine decoupled from the output shaft by a clutch assembly in a disengaged state, the method comprising:

- driving rotation of the propulsor about a rotational axis with an electric machine coupled with the propulsor by the output shaft;
- coupling the engine with the propulsor by controlling the engine to drive rotation of the engine drive gear about the rotational axis to configure the clutch assembly in an engaged state, the clutch assembly in the engaged state having a plurality of sliding clutch members engaged with a coupling drive shaft mounted to the output shaft, the plurality of sliding clutch members radially moveable relative to the coupling drive shaft between an outer radial position and an inner radial position, the sliding clutch members in the outer radial position engaged with the coupling drive shaft in the engaged state, the sliding clutch members in the inner radial position disengaged from the coupling drive shaft in the disengaged state, coupling the engine with the propulsor including controlling the engine to increase a rotation speed of the engine drive gear until the sliding clutch members move from the inner radial position to the outer radial position.

12. The method of claim 11, wherein the engine includes an engine output shaft, and the coupling the engine with the propulsor further includes controlling the engine to increase a rotation speed of the engine output shaft greater than or equal to a predetermined rotation speed corresponding to the engaged state.

13. The method of claim 11, wherein coupling the engine with the propulsor includes relighting the engine.

14. The method of claim 11, further comprising deenergizing the electric machine subsequent to coupling the engine with the propulsor.

15. An aircraft propulsion system, comprising:

- an engine;
- an electric machine;
- a gearbox including an output shaft, an engine drive gear, and a clutch assembly, the output shaft having a rotational axis, the electric machine coupled with the output shaft, the engine drive gear extending circumferentially about the output shaft, the engine drive gear rotatable relative to the output shaft, the engine drive gear selectively couplable with the output shaft by the clutch assembly,
  - the clutch assembly including a coupling drive shaft, a clutch housing, and a plurality of sliding clutch members, the coupling drive shaft mounted to the output shaft, the clutch housing mounted to the engine drive gear, the plurality of sliding clutch members moveably mounted to the clutch housing, the plurality of sliding clutch members radially moveable between an outer radial position and an inner radial position, the plurality of sliding clutch members biased in the inner radial position, the plurality of sliding clutch members in the outer radial position engaged with the coupling drive shaft, the clutch assembly coupling the engine and the output shaft with the plurality of sliding clutch members in the outer radial position, the plurality of sliding clutch members in the inner radial position disengaged from the coupling drive shaft, the engine decoupled from the output shaft with the plurality of sliding clutch members in the inner radial position; and
- a propulsor driven by the output shaft.

16. The aircraft propulsion system of claim 15, wherein the coupling drive shaft includes a first plurality of teeth, each of the plurality of sliding clutch members includes a second plurality of teeth, the first plurality of teeth are radially outward of the second plurality of teeth, and the second plurality of teeth are engaged with the first plurality of teeth with the plurality of sliding clutch members in the outer radial position.

17. The aircraft propulsion system of claim 15, wherein the clutch housing forms a plurality of apertures, each of the plurality of sliding clutch members includes a post disposed within a respective one of the plurality of apertures, and the post is radially moveable within the respective one of the apertures.

18. The aircraft propulsion system of claim 15, wherein each of the plurality of sliding clutch members includes a clutch body and a weight, the clutch body is configured to engage the coupling drive shaft with a respective one of the plurality of sliding clutch members in the outer radial position, and the weight is selectively attachable on the clutch body.

19. The aircraft propulsion system of claim 15, wherein the gearbox further includes a bearing disposed between the output shaft and the engine drive gear, and the engine drive gear is rotatable relative to the output shaft on the bearing.

20. The aircraft propulsion system of claim 15, wherein the engine includes an engine output shaft, the gearbox includes an input shaft and a layshaft assembly, the engine output shaft is coupled with the input shaft, and the layshaft assembly couples the input shaft with the engine drive gear.

* * * * *